(12) United States Patent
Sahu et al.

(10) Patent No.: US 7,941,001 B1
(45) Date of Patent: May 10, 2011

(54) MULTI-PURPOSE SCALER

(75) Inventors: Shilpi Sahu, Bangalore (IN); Sanjay Garg, Bangalore (IN); Nikhil Balram, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 1500 days.

(21) Appl. No.: 11/294,708

(22) Filed: Dec. 5, 2005

(51) Int. Cl.
*G06K 9/32* (2006.01)

(52) U.S. Cl. ........ 382/298; 345/660; 348/581; 358/451; 708/208

(58) Field of Classification Search .................. 382/100, 382/232, 233, 254, 256, 257, 258, 274, 276, 382/277, 293, 298, 299; 345/660–671; 348/561, 348/581; 358/451; 708/208
See application file for complete search history.

(56) References Cited

U.S. PATENT DOCUMENTS

| | | | | |
|---|---|---|---|---|
| 4,660,081 A * | 4/1987 | Heerah | ............. | 348/580 |
| 4,707,742 A * | 11/1987 | Field et al. | .............. | 348/580 |
| 5,345,272 A * | 9/1994 | Ersoz et al. | .............. | 348/561 |
| 5,682,179 A * | 10/1997 | Cahill, III | .............. | 345/667 |
| 5,754,162 A * | 5/1998 | Cahill, III | .............. | 345/660 |
| 5,831,592 A * | 11/1998 | Cahill, III | .............. | 345/667 |
| 6,680,752 B1 * | 1/2004 | Callway et al. | .............. | 348/448 |
| 2006/0115184 A1 * | 6/2006 | Michel | .............. | 382/299 |

* cited by examiner

*Primary Examiner* — Anand Bhatnagar
(74) *Attorney, Agent, or Firm* — Ropes & Gray LLP

(57) ABSTRACT

A multi-purpose scaler utilizes a vertical scaler module and a moveable horizontal scaler module to resample a video signal either vertically or horizontally according to a selected scaling ratio. The moveable horizontal scaler module resides in one of two slots within the multi-purpose scaler architecture to provide either horizontal reduction or horizontal expansion as desired. The multi-purpose scaler is arranged to scale the video using non-linear 3 zone scaling in both the vertical and horizontal direction when selected. The multi-purpose scaler is arranged to provide vertical keystone correction and vertical height distortion correction when the video is presented through a projector at a non-zero tilt angle. The multi-purpose scaler is also arranged to provide interlacing and de-interlacing of the video frames as necessary.

16 Claims, 8 Drawing Sheets

MULTI-PURPOSE SCALER

FIELD OF THE INVENTION

The present invention generally relates to signal processing applications. More particularly, the present invention is related to a circuit, system, and method for a scaler that provides both horizontal scaling and vertical scaling with additional scaler functions.

BACKGROUND

A scaler, or pixel/line sample rate converter, is a device that can resample a video horizontally or vertically. A scaler is an essential requirement for a digital video processor, in order to fit the incoming video to the desired display resolutions.

The ratio of input resolution to the desired output resolution is called the scaling ratio, which generates a linear mapping of the output pixel positions of the target video frame to the input pixel positions in the source video frame. Depending upon the mapping, a filter corresponding to the mapped position is picked from a bank of poly-phase filters, for generating each output pixel. Using appropriate filters during scaling for various scaling ratios ensures a clean, non-aliased and sharp output picture.

Since good quality vertical scaling operation requires more than 1 tap, scaler hardware needs to have access to either line buffers storing a few lines or a frame buffer. A set of dedicated line buffers is more economical than a frame buffer, since this also saves or decreases use of SDRAM bandwidth by a scaler when there are multiple applications accessing the SDRAM. However, there may be an associated area disadvantage of having a separate set of line buffers exclusively for a scaler. Accordingly, the designs for a particular scaler may vary greatly depending on the situations and applications to which the scaler is applied.

BRIEF DESCRIPTION OF THE DRAWINGS

Non-limiting and non-exhaustive embodiments are described with reference to the following drawings.

DETAILED DESCRIPTION OF THE PREFERRED EMBODIMENT

Figure 1:
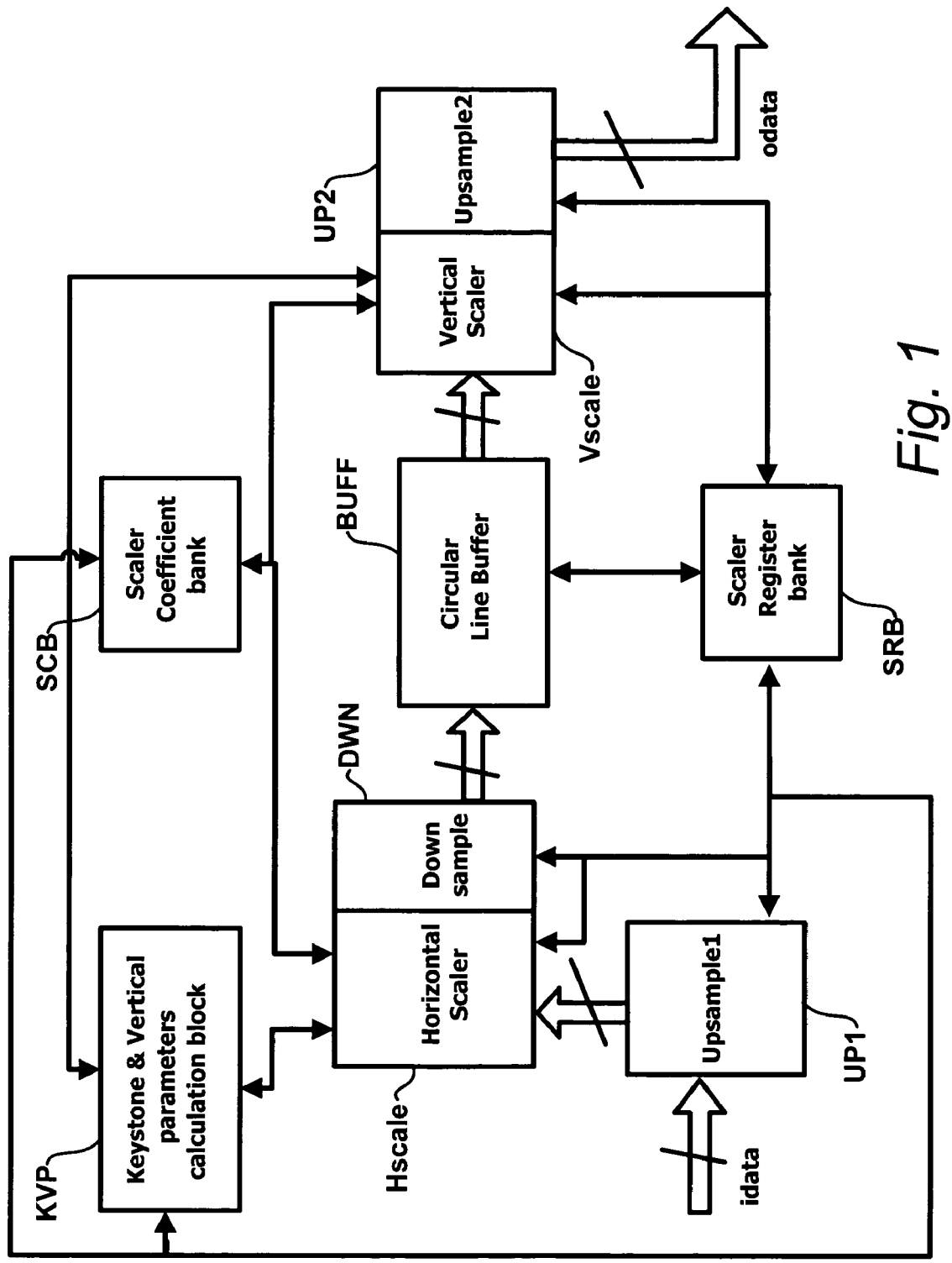
FIG. 1 is a schematic diagram of a multi-purpose scaler architecture with a horizontal scaler in first position.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, a multi-purpose scaler utilizes a vertical scaler module and a moveable horizontal scaler module to resample a video signal either vertically or horizontally according to a selected scaling ratio. The moveable horizontal scaler module resides in one of two slots within the multi-purpose scaler architecture to provide either horizontal reduction or horizontal expansion as desired. The multi-purpose scaler is arranged to scale the video using non-linear 3 zone scaling in both the vertical and horizontal direction when selected. The multi-purpose scaler is arranged to provide vertical keystone correction and vertical height distortion correction when the video is presented through a projector at a non-zero tilt angle. The multi-purpose scaler is also arranged to provide interlacing and de-interlacing of the video frames as necessary. The overhead of implementing these functions in the multi-purpose scaler of the present invention is small in terms of number of gates and complexity of control logic and register programming as compared to a single function scaler. The multi-purpose scaler solution provides significant savings in die area as compared to the sum of the individual areas that would be required if each function was implemented as a separate scaling block.

Figure 2:
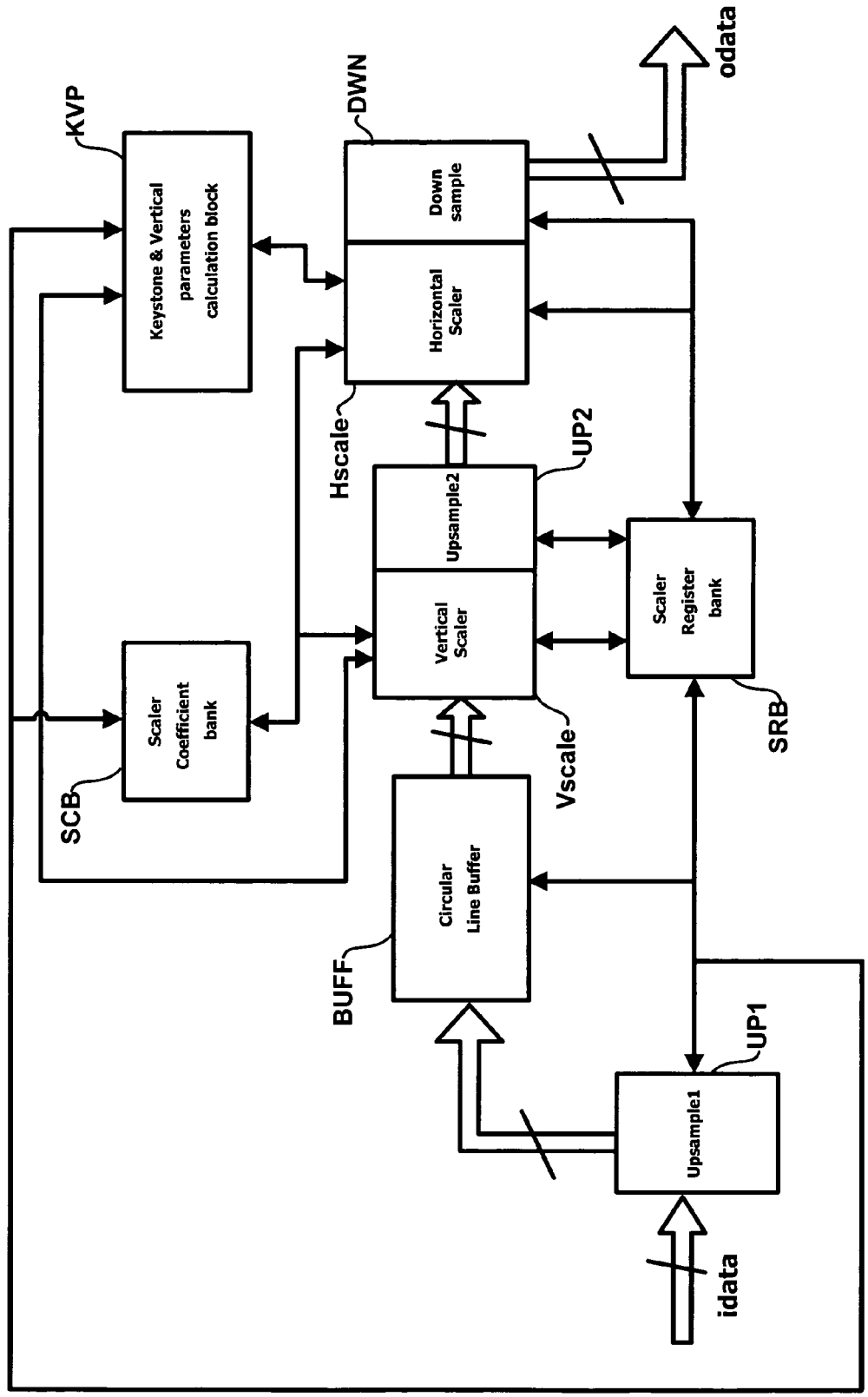
FIG. 2 is a schematic diagram of a multi-purpose scaler architecture with a horizontal scaler in a second position.

FIG. 1 and FIG. 2 are schematic diagrams of a multi-purpose scaler architecture with a horizontal scaler in a first position (FIG. 1) and the horizontal scaler in a second position (FIG. 2), in accordance with the present disclosure. The multi-purpose scaler circuit is comprised of modules that include: a horizontal scaler (Hscale), a vertical scaler (Vscale), two up-samplers (UP1, UP2), a down-sampler (DWN), circular line buffer (Buff) keystone and vertical parameters calculation block/module (KVP), scaler register bank (SRB), and scaler coefficient bank (SCB).

One embodiment of the multi-purpose scaler presented herein can scale data to any scaling ratio starting from much less than one (expansion) to fifteen (reduction) in both horizontal and vertical directions. In another embodiment, the multi-purpose scaler has three scaling channels, each channel carrying a pixel, which can be used for scaling data in RGB, YCbCr, Alpha-YC (i.e., On Screen Display or OSD) or YC formats.

As the input video data (idata) is received by the multi-purpose scaler the input data (idata) forward through the first up sampler (UP1). The first up-sampler (UP1) up-samples data from 422 to 444 format. The first up-sampler (UP1) is enabled in when the horizontal scaler (Hscale) is in the first slot (before the vertical scaler (Vscale)) as depicted in FIG. 1, and data is in YC or Alpha-YC format. When the horizontal scaler (Hscale) is in the first slot, the multi-purpose scaler is arranged for horizontal reduction as is described further below. If instead, the horizontal scaler (Hscale) is in slot 2 (after the vertical scaler (Vscale)) as depicted in FIG. 2, then the first up-sampler is disabled. Once the data passes through or is processed by the first up-sampler (UP1), the data is forwarded to either the horizontal scaler (Hscale) or the circular line buffer (Buff).

When the multi-purpose scaler is configured for horizontal reduction, horizontal scaler (Hscale) receives the up-sampled data from the first up-sampler (UP1). Horizontal scaler (Hscale) scales the video horizontally. Placing the horizontal scaler (Hscale) in the first slot reduces the size of data being stored in the line buffers and therefore more lines can be stored in the circular line buffer (Buff). In the embodiment depicted by FIG. 2, the horizontal scaler (Hscale) is put in a second slot when horizontal expansion or non-linear scaling is required. In another additional embodiment (not shown), the horizontal scaler (Hscale) is removed from the scaling path when no horizontal scaling is required. Also, as described below with relation to the non-linear scaling function provided by the multi-purpose scaler, the horizontal scaler (Hscale) may calculate the variable horizontal scaling ratio for horizontal non-linear 3 zone scaling as illustrated by the associated keystone and vertical parameters calculation block (KVP).

The scaler register bank (SRB) is comprised of registers which are programmed by a host interface with the register values such as input and output resolutions, operating modes, and the like that may affect various aspects of scaling of the video signal. In one embodiment, the register bank (SRB) directly or indirectly controls all sub-modules of the scaler. In another embodiment, the registers required for each scaler module reside locally in the corresponding module (e.g., registers for vertical scaler reside in the vertical scaler (Vscale)), and a separate register bank as shown FIG. 1 and FIG. 2 is not used.

Also, the horizontal scaler (Hscale) communicates with the scaler coefficient bank (SCB). The scaler coefficient bank (SCB) is comprised of registers which contain the programmable scaling coefficients both for the vertical scaler (Vscale) and the horizontal scaler (Hscale). In an alternative embodiment, separate coefficient banks are used for the horizontal coefficients and the vertical coefficients separately.

After processing by the horizontal scaler (Hscale), the video data is processed by the down-sampler (DWN). In one embodiment, the down-sampler (DWN) is enabled in YC or Alpha-YC mode. The down-sampler (DWN) also reduces the size of pixels going into the circular line buffer (Buff) when horizontal scaler is put in the first slot as shown in FIG. 1.

Presence of the circular line buffer (Buff) makes vertical scaling and horizontal non-linear scaling possible without the presence of SDRAM before the scaler, provided the ratio of active vertical lines in the input to the active vertical lines in the output is equal to the ratio of total vertical lines in the input to the total vertical lines at the output of the scaler. Wherever this condition is not fulfilled or vertical non-linear scaling is required, presence of SDRAM is needed. In other embodiments, the circular line buffer (Buff) may be another type of buffer than that shown, or may be another type of memory circuit.

The circular line buffer (Buff) allows a variable number of lines to be stored for different line sizes and different pixel widths. With the different number of lines for different line sizes, smaller line sizes may take advantage of the maximum number of vertical scaling taps for better video quality. In most scaling scenarios, horizontal reduction is often associated with vertical reduction by a similar amount. Large vertical reduction leads to large temporary mismatches between input and output line rates which can be sustained due to availability of more space in the circular line buffer for smaller line sizes, without increasing the SDRAM bandwidth requirement. In one embodiment, the circular line buffer (Buff) comprises of a write controller, which writes data into the memory and a 1280×144 single port RAM. Having a consolidated chunk of memory is more cost effective than a memory made of distributed components and leads to more area efficiency at a minimal overhead of extra control logic. In one instance, the word size of 144 is chosen such that nine 16 bit pixels and six 24 bit pixels are packed in one memory word for the most effective memory use. In another embodiment, the circular line buffer also includes a read controller that reads data from the memory and supplies the vertical scaler (Vscale) with appropriate taps. For example, in a 16 bit mode, the maximum number of vertical taps is eight, while for a 24 bit mode, the maximum number of vertical taps is five.

Alternatively, the circular line buffer (Buff) may be used to store vertical scaling coefficients as another location for the scaler coefficient bank (SCB). The memory required is 33 extra words (64 phases, maximum 33 are stored for symmetry). Since vertical scaling coefficients change only once every line, the coefficients may be fetched once every line from the circular line buffer (Buff) during the horizontal blanking interval.

Once the vertical scaling taps are read from the circular line buffer (Buff), the taps are forward to the vertical scaler (Vscale). The vertical scaler (Vscale) scales video image vertically using the taps provided. As with the horizontal scaler (Hscale) previously described, the vertical scaler (Vscale) communicates with the keystone and vertical parameters calculation block (KVP). The keystone and vertical parameters calculation block (KVP) calculates the keystone correction parameters which vary from every line and passes on the calculated values to the vertical scaler (Vscale) and the horizontal scaler (Hscale). The keystone and vertical parameters calculation block (KVP) also calculates the variable vertical scaling ratio for vertical non-linear 3 zone scaling. After the vertical scaling of the image, the video data is provided to the second up-sampler (UP2).

The vertical scaler (Vscale) also communicates with the scaler register bank (SRB) and the scaler coefficient bank (SCB) for the registry entries and the coefficients used for appropriate vertical scaling applied to the image.

The second up-sampler (UP2) up-samples data from 422 to 444 format. The second up-sampler (UP2) is enabled when horizontal scaler (Hscale) is in the second slot (after the vertical scaler (Vscale)) as depicted in FIG. 2, and the data is in YC or Alpha-YC format.

Once the vertical and horizontal scaling are complete, the scaled image is provide as video output data (odata) to other circuitry that processes the image for output to a screen, printer, or other image output device.

In one embodiment, the multi-purpose scaler is able to switch the position of the horizontal scaler (Hscale) in the path of processing the signal by using a multiplexer to selectively switch the horizontal scaler (Hscale) into position.

Figure 3:
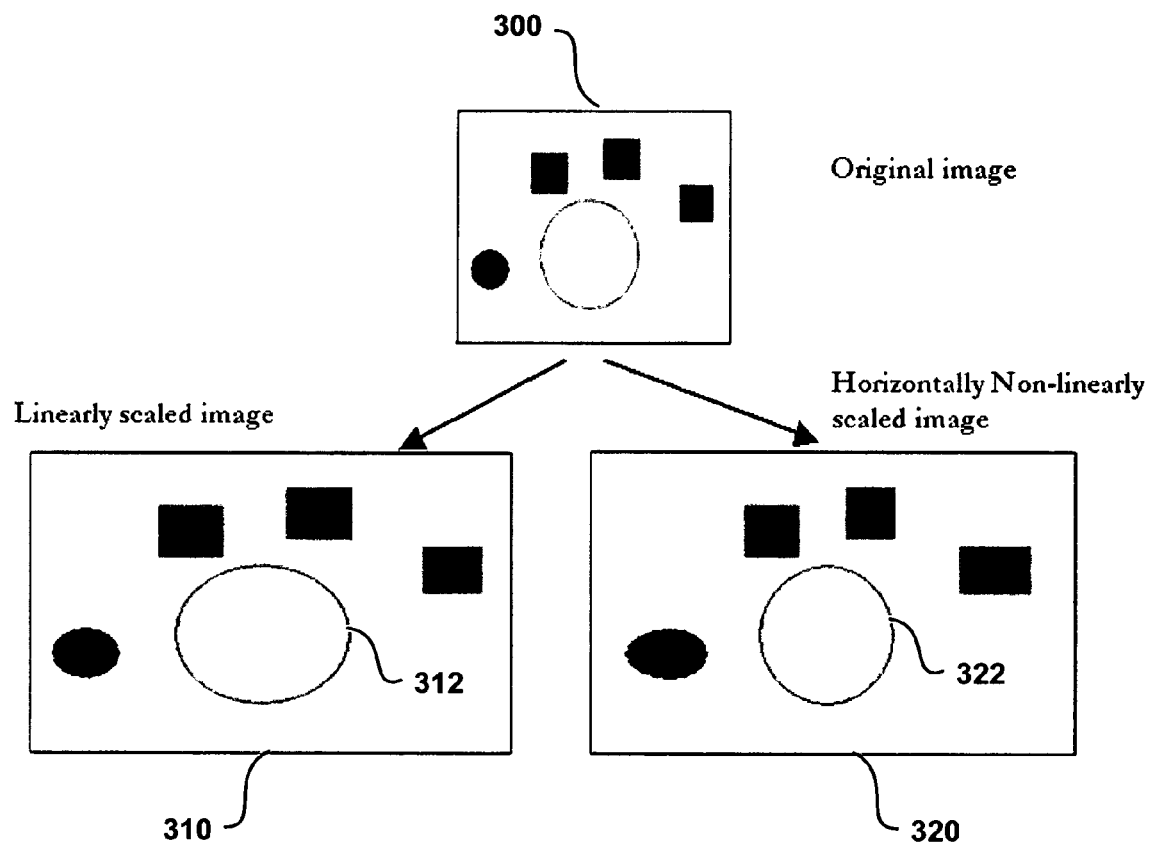
FIG. 3 is an exemplary diagram illustrating the difference between linear and non-linear scaling as provided by the multi-purpose scaler.

FIG. 3 is an exemplary diagram illustrating the difference between linear and non-linear scaling as provided by the multi-purpose scaler, in accordance with the present disclosure. The original image (300) after plain scaling results in the linearly scaled image (310). The original image (320) after horizontal non-linear scaling results in the horizontally non-linearly scaled image (320).

The scaling process can result into an output with a very different aspect ratio than that of the input. For example, a 4:3 video (640×480) may be scaled to fill 16:9 display (1920× 1080). Such large changes in the aspect ratio might be undesirable while viewing video. Examining the linearly scaled image (310), the previous large circle (302) of the original image (300) has been skewed by the aspect ratio change to an oval (312). However, non-linear scaling mitigates this skewed perspective by scaling objects in the center of the image less than those towards the edge of the image as illustrated by the circle (322) in the horizontally non-linearly scaled image (320).

Through nonlinear scaling, the aspect ratio of the output frame may be preserved in at least in the desired portion of central region of the image. The corners of the horizontally non-linearly scaled image (320) are scaled non-linearly with a linearly increasing or decreasing scaling ratio, to maintain the overall scaling ratio's average. The linear change in the scaling ratio in the corner regions of the horizontally non-linearly scaled image (320) and continuity in scaling ratio through out the frame leads to a smoothly scaled picture. The picture has the aspect ratio preserved in the center and smoothly tapering towards the corner zones. In absence of a continuous gradation in the scaling ratio, movements in the corner zones of a non-linearly scaled video stand out. A continuous gradation in the scaling ratio also obviates the requirement of too many zones each associated with a different fixed scaling ratio. A continuously varying scaling ratio in one zone is equivalent or better in performance than discrete scaling ratios in 16 zones.

Figure 4:
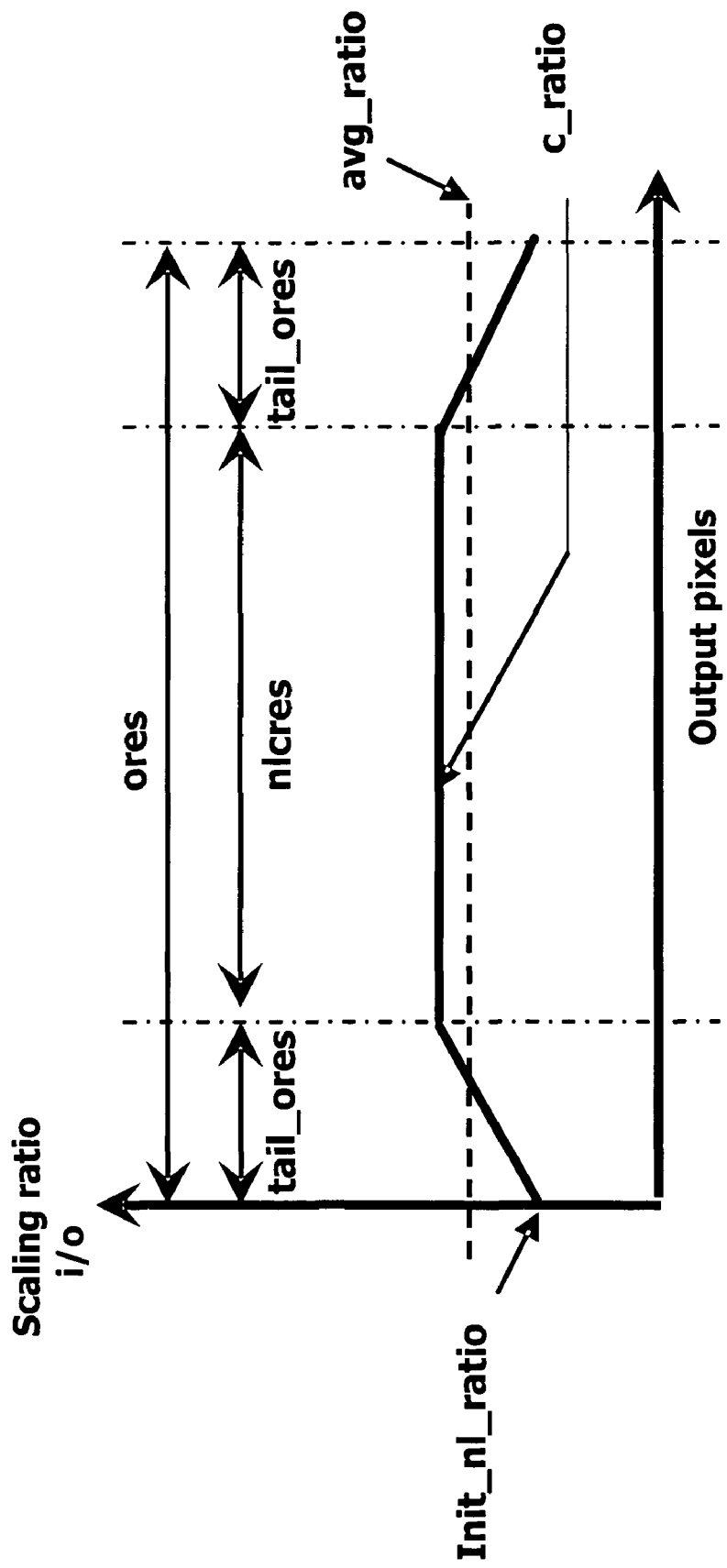
FIG. 4 is a graph of an exemplary scaling ratio for a non-linear scaled image.

FIG. 4 is a graph of an exemplary scaling ratio for a non-linear scaled image, in accordance with the present disclosure. The graph illustrates the change in scaling ratio over the change in output pixels. In the graph, "ores" refers to the horizontal output resolution, "nlcres" refers to the resolution of the central region of the image where the aspect ratio is preserved (horizontal scaling ratio=vertical scaling ratio=c_ratio), "tail_ores" is the resolution of the corner regions where the image is non-linearly scaled. The horizontal scaling ratio starts with the value "init_nl_ratio" at the zeroth pixel, and increments/decrements by a constant value "inc_nl_ratio" every pixel to equal c_ratio after the tail_ores pixels. The scaling ratio remains constant for the nlcres pixels and then falls back linearly to init_nl_ratio. The init_nl_ratio and inc_nl_ratio are calculated to maintain the average horizontal scaling ratio ("avg_ratio") over the whole of horizontal output resolution. The horizontal non-linear correction hardware receives values of nlcres, c_ratio, init_nl_ratio and inc_nl_ratio as registers calculated in software. The continuous scaling ratio is calculated from the above values in hardware itself.

Smooth vertical non-linear 3 zone scaling may also be applied to the image similarly as the horizontal non-linear 3 zone scaling described above, but in the vertical domain. The vertical scaling ratio is maintained equal to the horizontal aspect ratio in the centre, but tapers off linearly in the corner regions. The implementation of this functionality is shared with the keystone and vertical parameters calculation block (KVP) in the multi-purpose scaler hardware shown in FIG. 1 and FIG. 2.

Figure 5:
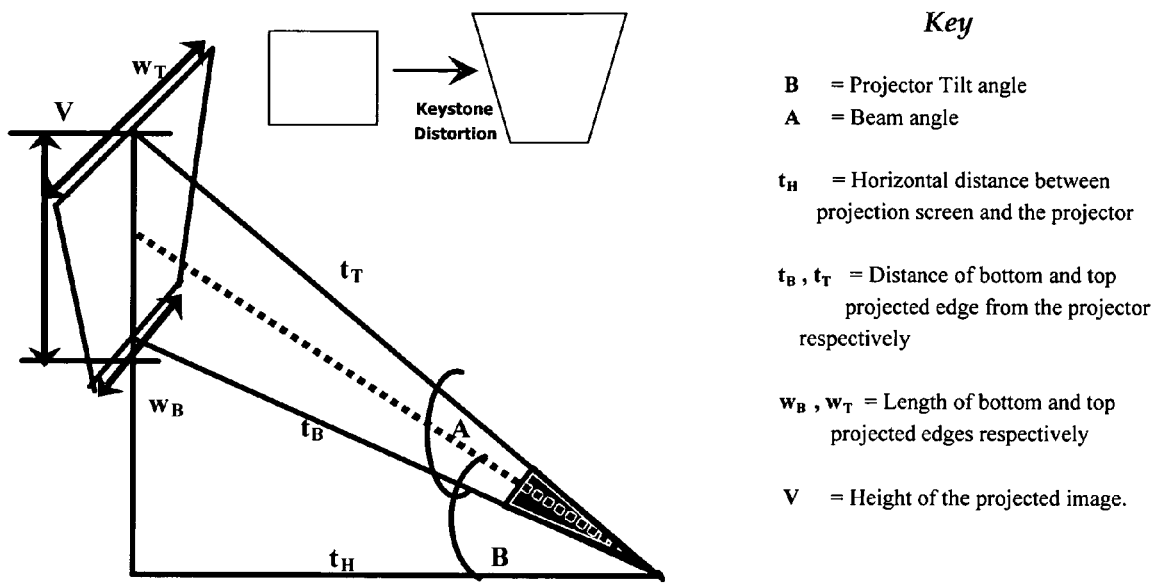
FIG. 5 shows an exemplary illustration of keystone distortion.
Figure 6:
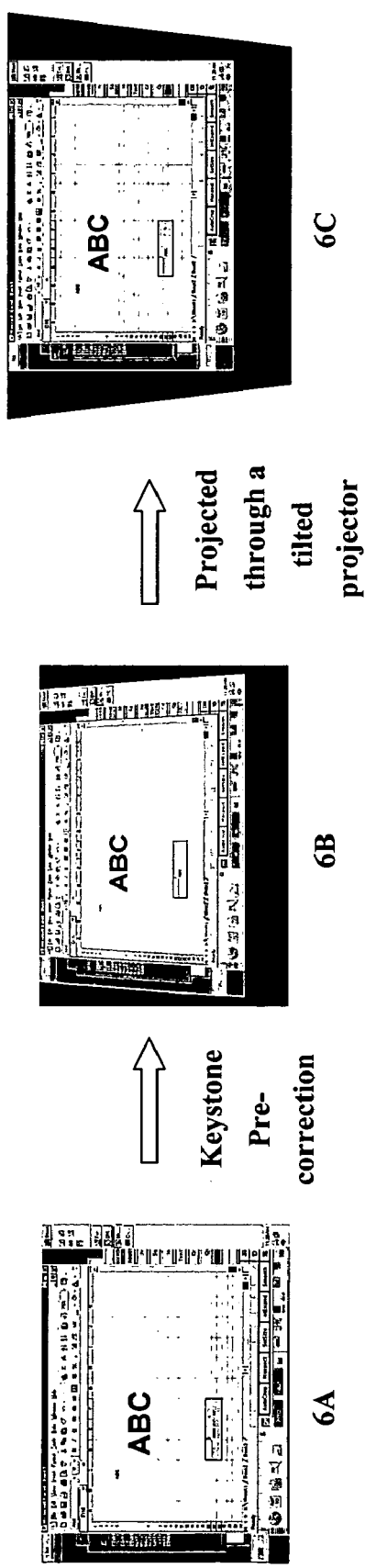
FIG. 6 shows an exemplary illustration of a keystone corrected image.

FIG. 5 and FIG. 6 show an exemplary illustration of keystone distortion, and a keystone corrected image, in accordance with the present disclosure. The multi-purpose scaler described herein includes functionality that compensates for keystone distortion. Keystone correction is required for correcting the distortion in the projected image due to non-zero tilt angle in the projectors. This correction is done by pre-calculating the distortion, given a tilt-angle, and then applying the inverse distortion on the scaled image.

In one embodiment, the keystone correction hardware in the multi-purpose scaler can correct distortion for angles ranging from −35°<B<35° and A<20°. More than one kind of distortion may be applicable to a keystone distorted image, including: vertical height distortion; horizontal aspect ratio distortion; and vertical scaling factor gradient distortion.

Vertical height distortion corresponds to when tilt of the projector results in a much elongated projection than the actual height of the image. The vertical height distortion results in change in aspect ratio. The increase in vertical height of the projection may be computed geometrically using the variables present in FIG. 4 so that the vertical height distortion may be corrected:

Height of the Projected image with B=0 (no tilt):

$$V_{no\text{-}tilt} = \text{Output } Y \text{ resolution} \quad (\text{Eq1})$$
$$= 2 \cdot t_H \cdot \tan(A/2)$$

With tilt Angle=B, height of the projection increases to:

$$V = t_H \cdot \sin(B + A/2) - t_B \cdot \sin(B - A/2) \quad (\text{Eq2})$$
$$= t_H \cdot (\tan(B + A/2) - \tan(B - A/2))$$
$$= V_{no\text{-}tilt} \cdot (\tan(B + A/2) - \tan(B - A/2))/(2 \cdot \tan(A/2))$$
$$= V_{no\text{-}tilt} \cdot F \text{ where}$$
$$F = (\tan(B + A/2) - \tan(B - A/2))/(2 \cdot \tan(A/2))$$

Factor F can be simplified to $\sec^2 B$ assuming A<20.

The vertical height distortion may be corrected by pre-distorting the height to effective vertical height:

$$V_{\mathit{eff}} = V_{no\text{-}tilt}/F \quad (\text{Eq3})$$

The difference is then padded with black lines at the bottom as shown in 6B of FIG. 6.

After vertical height correction, the picture of interest now lies between start and end angles. The start angle can be computed as B+A/2 and the end angle as the angle $V_{\mathit{eff}}$ output lines away from the start angle. The middle angle (shown by the dotted line in FIG. 5) is an average of start and end angles.

Horizontal aspect ratio distortion refers to trapezoidal aspect resulting from a square image being projected through a tilted projector as shown in FIG. 5. The differential horizontal widths at various vertical positions (lines) may be corrected by applying inverse geometric correction to the horizontal scaling ratio and the effective horizontal resolution so that the effects of the projection are cancelled out.

When V in FIG. 5 is $V_{\mathit{eff}}$, then the following equations apply:

$$t_T = t_H/\cos(\text{start}) \quad (\text{Eq4a})$$
$$t_B = t_H/\cos(\text{end}) \quad (\text{Eq4b})$$

-continued $$w_{no\text{-}tilt} = \text{Output } X \text{ resolution} \quad \text{(Eq5)}$$
$$= \text{Width of the projected image if } B = 0 \text{ (no-tilt)}$$
$$= t_H \cdot 2 \cdot \tan(A/2)$$

$$w_T = t_T \cdot 2 \cdot \tan(A/2) = w_{no\text{-}tilt}/\cos(\text{start}) \quad \text{(Eq6a)}$$

$$w_B = t_B \cdot 2 \cdot \tan(A/2) = w_{no\text{-}tilt}/\cos(\text{end}) \quad \text{(Eq6b)}$$

Horizontal correction for width is done by pre-distorting the output resolution of each line according to $$w_{line} = w_{no\text{-}tilt} \cdot \cos(\text{angle}_{line}) \text{ where,}$$
$$\text{start} <= \text{angle}_{line} <= \text{end} \quad \text{(Eq7)}$$

The difference is then padded with an appropriate number of black pixels on either side as shown in 6B of FIG. 6.

Vertical scaling factor gradient distortion refers to when the projection appears stretched more at top than at the bottom when the tilt is in the positive direction, or when the projection appears stretched more at bottom than at the bottom if the tilt is in the negative direction. Vertical scaling factor gradient distortion is corrected by varying the vertical scaling ratio while generating every output line, proportional to the corrected horizontal scaling ratio which also changes every line.

$$H_{ratio\,no\text{-}tilt} = \frac{\text{input } X \text{ resolution}}{H_{no\text{-}tilt}} \quad \text{(Eq8a)}$$

$$V_{ratio\,eff} = \frac{\text{input } Y \text{ resolution}}{V_{eff}} \quad \text{(Eq8b)}$$

$$H_{ratio,line} = H_{ratio\,no\text{-}tilt}/\cos(\text{angle}_{line}) \quad \text{(Eq9a)}$$

From Eqns 8a, 8b and 9a, $$V_{ratio,line} = V_{ratio\,eff}/\cos(\text{angle}_{line}) \quad \text{(Eq9b)}$$

According to Eqns 8b and 9b, the average $V_{eff}$ turns out to be $$V_{eff,avg} = (V_{eff} \cdot \cos(\text{start}) + \ldots V_{eff} \cdot \cos(\text{angle}_{line}) + \ldots \quad \text{(Eq11)}$$
$$V_{eff} \cdot \cos(\text{end}))/V_{eff}$$
$$\approx V_{eff} \cdot \cos((\text{start} + \text{end})/2)$$
$$= V_{eff} \cdot \cos(\text{angle}_{midline})$$

The plot of cosine of angles between start and end angles may be approximated as a linear curve, where A<20° and −35°<B<35°. In order to maintain the $V_{ratio,avg}$ as $V_{ratio,eff}$ and to compensate for the cosine factor in equation 11, $V_{ratio\,line}$, as calculated in equation 9b is corrected by multiplying with the same cosine factor.

$$V_{ratio,line} = \frac{V_{ratio\,eff} \cdot \cos(\text{angle}_{mid\,line})}{\cos(\text{angle}_{line})} \quad \text{(Eq12)}$$

Using the above vertical scaling ratio per line for the image, the vertical scaling factor gradient distortion may be compensated for by the multi-purpose scaler of the present disclosure so that a corrected image is produced (e.g., 6C of FIG. 6). In one embodiment, the equations above are used to create cosine tables that correspond to the various possible angles and other coefficients for the keystone distorted image. The multi-purpose scaler is then able to use the cosine tables as fixed lookup tables for determining the keystone correction adjustments for the image in hardware rather than requiring downstream software manipulation of the image to correct for the keystone distortion. The correction for the keystone distortion therefore becomes a hardware-implemented solution provided by a provided by a hardware-implemented keystone correction module (e.g., KVP of FIG. 1 and FIG. 2) rather than a software dependent solution. In one implementation, the cosine tables do not consume more than 2000-3000 gates when synthesized at 200 MHz.

In one embodiment, for automatic keystone correction provided by the hardware, the multi-purpose scaler refers to the following registers that are programmed in the scaler register bank (SRB) shown in FIG. 1 and FIG. 2: Start-angle (start); End-angle (end); Increment angle (inc=(end−start)/($V_{eff}$−1)); and Effective output resolution ($V_{eff}$). Other registers may also be used for other parameters that affect the correction of the keystone distortion using the multi-purpose scaler of the present disclosure.

Figure 8:
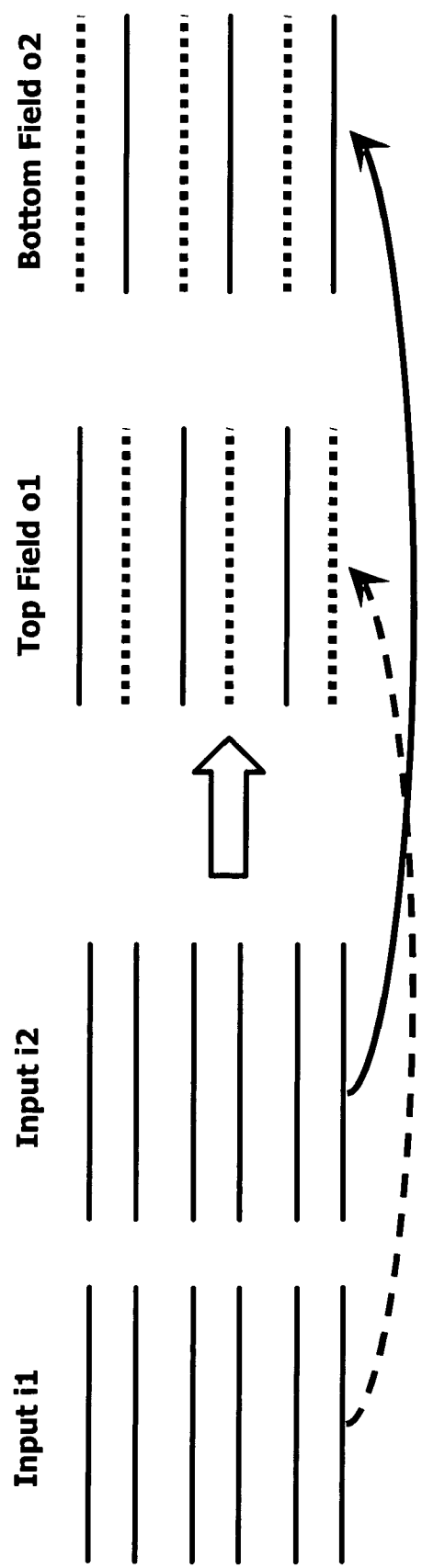
FIG. 8 illustrates interlacing of the lines of an image provided by the multi-purpose scaler, in accordance with the present disclosure.

FIG. 8 and FIG. 9 illustrate de-interlacing and interlacing of the lines of an image provided by the multi-purpose scaler, in accordance with the present disclosure.

Various applications of video signal processing may also take advantage of the de-interlacing and interlacing functionality provided by the multi-purpose scaler herein described. For example, when two simultaneous channels are supported in the system such as PIP (picture in picture) or PAP (picture and picture), in addition to the main picture, then, having two full-fledged de-interlacers, one for each channel is prohibitive with respect to the increase in area and consumption of memory bandwidth. A compromise is reached in case of PIP channel, by using the scaler for spatial de-interlacing instead of a full-fledged de-interlacer for PIP channel.

De-interlacing is line-doubling of video frame. By de-interlacing through the multi-purpose scaler, an advantage is gained by using more taps for vertical scaling and integrating scaling with de-interlacing, for example, from 480i to 1080p, 1080i to 480p or 480i to 240p.

The difference between scaling an interlaced input (field) to progressive output (frame) and progressive to progressive scaling is the field polarity input. Interlaced data is transmitted in top ("odd") and bottom ("even") fields alternatively. The lines in the bottom field are shifted down with respect to those in the top field by half an input line. While scaling the top field, the multi-purpose scaler compensates for the half-line phase-shift in the lines of the bottom field by shifting the mapping between the input and output pixels by half an input line, in the opposite direction. The shift in mapping results in the selection of different vertical scaling coefficients in the top and the bottom fields depending on the phase shift.

Figure 7:
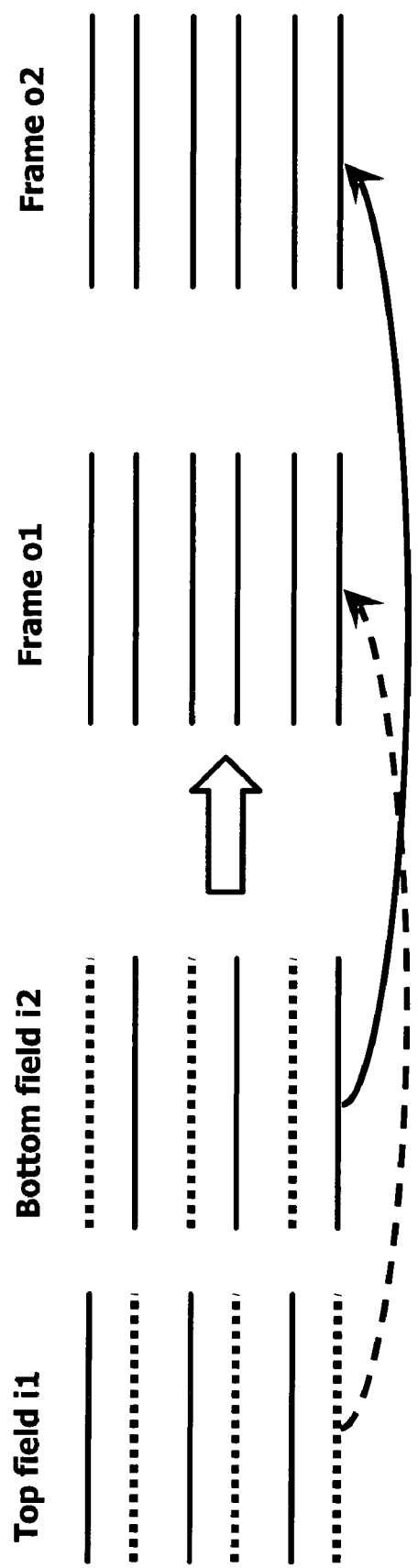
FIG. 7 illustrates de-interlacing of the lines of an image provided by the multi-purpose scaler.

As shown in FIG. 7, the solid lines in the input fields (top field i1, bottom field i2) are the input lines and the dotted lines mark the spatially half-line shifted positions which match the line positions in the other field. The output frame (frame o2) generated by bottom field (i2) has the output line positions shifted up by one-half an input line with respect to those of output frame (o1) generated by top field (i1).

The multi-purpose scaler may also be used as an interlacer. Just as de-interacing is vertical up-scaling by factor of 2, interlacing is synonymous with vertical downscaling by factor of 2. However, downscaling without anti-alias pre-filtering may result in gross vertical aliases. Since the multi-purpose scaler described herein already has programmable filters and taps, interlacing may be implemented using the same logic that was used for de-interlacing with some conceptual differences.

For interlacing, the input is progressive and output is interlaced. The multi-purpose scaler generates one top and one bottom field alternatively. This differs from de-interlacing in that the half-line phase shift is introduced between the lines of top and the bottom fields. The mapping for the bottom field lines is shifted down by half an output line with respect to that for the top field lines. An addition advantage interlacing using the multi-purpose scaler is the combination of scaling and interlacing in a single circuit, such as from 480p to 1080i, 1080p to 480i or 240p to 480i.

As shown in FIG. 8, the inputs i1 and i2 are progressive frames, from which the interlaced fields (top field o1, bottom field o2) are extracted respectively. The solid lines in the output field (top field o1, bottom field o2) are the lines generated by the scaler. The dotted lines mark the spatially half-line shifted positions which match the line positions in the other field. The output field (bottom field o2) generated by the corresponding input frame (input i2) has the output line positions shifted down by one-half an output line with respect to those of the other output field (top field o1) generated by the input frame (input i1).

Implementation of all these functions described above in a single multi-purpose scaler saves area, increases reusability of the same circuit for different applications, and makes including the variety of functions provided by the multi-purpose scaler more economical.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A multi-purpose scaler, comprising:
   a line buffer for temporarily storing data associated with an image;
   a horizontal scaler that is configured to process the data when horizontal scaling of the image is selected, wherein the horizontal scaler is coupled in a first position for processing the data before the line buffer when horizontal reduction of the image is selected, and the horizontal scaler is coupled in a second position for processing the data after the line buffer when horizontal expansion is selected; and
   a vertical scaler that is coupled to the output of the line buffer, wherein the vertical scaler is configured to process the data when vertical scaling of the image is selected, and wherein the line buffer, horizontal scaler, and vertical scaler are further configured to selectively de-interlace lines of the image, selectively interlace lines of the image, and selectively scale the image non-linearly in at least one of a horizontal and vertical direction, wherein selectively de-interlacing lines of the image further comprises generating a first output frame from a first field, wherein the first output frame has output line positions shifted up by one-half an input line with respect to those of a second output frame generated from a second field.

2. The multi-purpose scaler of claim 1, wherein the line buffer is a circular line buffer that is configured to allow a variable number of lines to be stored for different line sizes and different pixel sizes.

3. The multi-purpose scaler of claim 1, further comprising:
   a scaler coefficient bank that is coupled to the horizontal and vertical scaler, wherein the scaler coefficient bank stores programmable coefficients which are used for vertical and horizontal scaling;
   a keystone parameter calculation module that is coupled to the horizontal scaler and the vertical scaler, wherein the keystone parameter calculation modules provides hardware-implemented correction of keystone distortion of the image;
   wherein the scaler coefficient bank is further configured to selectively scale the image non-linearly in at least one of a horizontal and vertical direction.

4. The multi-purpose scaler of claim 3, wherein the keystone parameter calculation module further includes functionality that assists the multi-purpose scaler in generating a cosine table, wherein the cosine table is configured as a lookup table for determining keystone correction adjustments for the image to compensate for the keystone distortion.

5. The multi-purpose scaler of claim 3, wherein the keystone parameter calculation module further includes functionality that assists the multi-purpose scaler to compensate for at least one of the following types of keystone distortion: vertical height distortion; horizontal aspect ratio distortion; and vertical scaling factor gradient distortion.

6. The multi-purpose scaler of claim 1, wherein selectively interlacing lines of the image further comprises generating a first output field from a corresponding first input frame, wherein the first output field has output line positions shifted down by one-half an output line with respect to those of a second output field generated from a second input frame.

7. The multi-purpose scaler of claim 1, wherein selectively scaling the image non-linearly in at least one of a horizontal and vertical direction further comprises non-linearly scaling the image according to three zones, wherein a continuous gradation of a scaling ratio is applied to the zones nearer to the edge of the image while a constant scaling ratio is applied to the zone corresponding to the center of the image.

8. The multi-purpose scaler of claim 1, further comprising:
   a first up-sampler that is coupled to an input of the multi-purpose scaler, wherein the first up-sampler is enabled when the horizontal scaler is coupled in the first position and the data is in a selected format;
   a second up-sampler that is coupled to the output of the vertical scaler, wherein the second up-sampler is enabled when the horizontal scaler is coupled in the second position and the data is in the selected format; and
   a down-sampler that is coupled to the output of the horizontal scaler.

9. A multi-purpose scaler, comprising:
   a line buffer for temporarily storing data associated with an image;
   a horizontal scaler that is configured to process the data when horizontal scaling of the image is selected, wherein the horizontal scaler is coupled in a first position for processing the data before the line buffer when horizontal reduction of the image is selected, and the horizontal scaler is coupled in a second position for processing the data after the line buffer when horizontal expansion is selected; and
   a vertical scaler that is coupled to the output of the line buffer, wherein the vertical scaler is configured to process the data when vertical scaling of the image is selected, and wherein the line buffer, horizontal scaler, and vertical scaler are further configured to selectively de-interlace lines of the image, selectively interlace lines of the image, and selectively scale the image non-linearly in at least one of a horizontal and vertical direction, wherein selectively interlacing lines of the image further comprises generating a first output field from a corresponding first input frame, wherein the first output field has output line positions shifted down by one-half an output line with respect to those of a second output field generated from a second input frame.

10. The multi-purpose scaler of claim 9, wherein the line buffer is a circular line buffer that is configured to allow a variable number of lines to be stored for different line sizes and different pixel sizes.

11. The multi-purpose scaler of claim 9, further comprising:
   a scaler coefficient bank that is coupled to the horizontal and vertical scaler, wherein the scaler coefficient bank stores programmable coefficients which are used for vertical and horizontal scaling;
   a keystone parameter calculation module that is coupled to the horizontal scaler and the vertical scaler, wherein the keystone parameter calculation modules provides hardware-implemented correction of keystone distortion of the image;
   wherein the scaler coefficient bank is further configured to selectively scale the image non-linearly in at least one of a horizontal and vertical direction.

12. The multi-purpose scaler of claim 9, wherein the keystone parameter calculation module further includes functionality that assists the multi-purpose scaler in generating a cosine table, wherein the cosine table is configured as a lookup table for determining keystone correction adjustments for the image to compensate for the keystone distortion.

13. The multi-purpose scaler of claim 9, wherein selectively interlacing lines of the image further comprises generating a first output field from a corresponding first input frame, wherein the first output field has output line positions shifted down by one-half an output line with respect to those of a second output field generated from a second input frame.

14. The multi-purpose scaler of claim 9, wherein selectively scaling the image non-linearly in at least one of a horizontal and vertical direction further comprises non-linearly scaling the image according to three zones, wherein a continuous gradation of a scaling ratio is applied to the zones nearer to the edge of the image while a constant scaling ratio is applied to the zone corresponding to the center of the image.

15. The multi-purpose scaler of claim 9, further comprising:
   a first up-sampler that is coupled to an input of the multi-purpose scaler, wherein the first up-sampler is enabled when the horizontal scaler is coupled in the first position and the data is in a selected format;
   a second up-sampler that is coupled to the output of the vertical scaler, wherein the second up-sampler is enabled when the horizontal scaler is coupled in the second position and the data is in the selected format; and
   a down-sampler that is coupled to the output of the horizontal scaler.

16. The multi-purpose scaler of claim 9, wherein the keystone parameter calculation module further includes functionality that assists the multi-purpose scaler to compensate for at least one of the following types of keystone distortion: vertical height distortion; horizontal aspect ratio distortion; and vertical scaling factor gradient distortion.

* * * * *